(12) United States Patent
Bhattacharjya et al.

(10) Patent No.: US 8,180,167 B2
(45) Date of Patent: May 15, 2012

(54) MODEL-BASED ERROR RESILIENCE IN DATA COMMUNICATION

(75) Inventors: Anoop K. Bhattacharjya, Campbell, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 972 days.

(21) Appl. No.: 12/174,513

(22) Filed: Jul. 16, 2008

(65) Prior Publication Data

US 2010/0014768 A1 Jan. 21, 2010

(51) Int. Cl.
*G06K 9/40* (2006.01)
*G06K 9/36* (2006.01)
*G06K 9/32* (2006.01)

(52) U.S. Cl. ......... 382/254; 382/275; 382/276; 382/289

(58) Field of Classification Search ........................ None
See application file for complete search history.

(56) References Cited

U.S. PATENT DOCUMENTS

| | | | |
|---|---|---|---|
| 5,613,048 A | 3/1997 | Chen et al. | |
| 5,751,927 A * | 5/1998 | Wason | 345/419 |
| 5,850,229 A * | 12/1998 | Edelsbrunner et al. | 345/473 |
| 6,392,759 B1 | 5/2002 | Kuwata et al. | 358/1.9 |
| 6,400,828 B2 * | 6/2002 | Covell et al. | 382/100 |
| 6,434,265 B1 * | 8/2002 | Xiong et al. | 382/154 |
| 6,484,101 B1 | 11/2002 | Lucas et al. | |
| 6,512,854 B1 * | 1/2003 | Mucci et al. | 382/275 |
| 6,879,709 B2 | 4/2005 | Tian et al. | |
| 6,919,892 B1 | 7/2005 | Cheiky et al. | |
| 7,015,926 B2 | 3/2006 | Zitnick, III et al. | |
| 7,054,468 B2 * | 5/2006 | Yang | 382/118 |
| 7,113,635 B2 | 9/2006 | Robert et al. | |
| 7,123,262 B2 | 10/2006 | Francini et al. | |
| 7,123,263 B2 | 10/2006 | Harvill | |
| 7,126,598 B2 | 10/2006 | Oh et al. | |
| 7,127,081 B1 | 10/2006 | Erdem | |
| 7,142,698 B2 | 11/2006 | Liu et al. | |
| 7,149,368 B2 * | 12/2006 | Tong et al. | 382/285 |
| 7,152,024 B2 | 12/2006 | Marschner et al. | |
| 7,158,658 B2 | 1/2007 | Liu et al. | |
| 7,460,730 B2 * | 12/2008 | Pal et al. | 382/284 |
| 7,593,589 B2 * | 9/2009 | Sugimoto | 382/266 |
| 7,907,784 B2 * | 3/2011 | Gladkova et al. | 382/232 |
| 8,000,394 B2 * | 8/2011 | Ito et al. | 375/240.26 |
| 2002/0041285 A1 | 4/2002 | Hunter et al. | |
| 2004/0091152 A1 * | 5/2004 | Brand | 382/224 |
| 2004/0205036 A1 * | 10/2004 | Prabhu et al. | 706/19 |
| 2005/0195296 A1 * | 9/2005 | Compton et al. | 348/243 |

(Continued)

FOREIGN PATENT DOCUMENTS

WO 99/35606 A1 7/1999

OTHER PUBLICATIONS

Nonlinear Dimensionality Reduction by Locally Linear Embedding, Sam T. Roweis and Lawrence K. Saul, Science, vol. 290, Dec. 22, 2000, pp. 2323-2326.*

(Continued)

*Primary Examiner* — Michelle Entezari

(57) ABSTRACT

Disclosed are embodiments of systems and methods to use a model-based technique for image error recovery in data communication. A low-dimensional representation is constructed of an image that contains errors. A manifold comprising image representations and a statistical model of the manifold are used to correct the errors in the image.

10 Claims, 11 Drawing Sheets

U.S. PATENT DOCUMENTS

| | | | |
|---|---|---|---|
| 2005/0226509 | A1 | 10/2005 | Maurer et al. |
| 2006/0215016 | A1 | 9/2006 | Cohen et al. |
| 2008/0063264 | A1* | 3/2008 | Porikli et al. ............... 382/159 |
| 2008/0069201 | A1* | 3/2008 | Zhu et al. ................. 375/240.1 |
| 2008/0253665 | A1* | 10/2008 | Mitarai et al. ............... 382/227 |
| 2009/0110332 | A1* | 4/2009 | Lin et al. ...................... 382/300 |

OTHER PUBLICATIONS

Facial Feature Tracking and Pose Estimation in Video Sequences by Factorial Coding of the Low-Dimensional Entropy Manifolds due to Partial Symmetries of Faces, Evan D. Mandel and Penio S. Penev, 2000 IEEE, p. 2345-2348.*

Bregler, C., et al., "Tracking People with Twists and Exponential Maps", Jun. 23, 1998.

Liu, Z., et al., "Robust Head Motion Computation by Taking Advantage of Physical Properties", Jan. 2000.

Xiao, J., et al., "Robust Full-Motion Recovery of Head by Dynamic Templates and Re-registration Techniques", Proceedings of the Fifth IEEE International Conference on Automatic Face and Gesture Recognition (FG'02) May 2002, pp. 156-162.

Jebara, T. S., et al., "Parametrized Structure from Motion for 3D Adaptive Feedback Tracking of Faces", MIT Media Laboratory, Perceptual Computing Technical Report #401, Nov. 28, 1996.

Wei, T., et al., "Height from Gradient with Surface Curvature and Area Constraints", Center for Image Technology and Robotics Tamaki Campus, Univ. of Auckland, CITR-TR-109, Dec. 2001.

* cited by examiner

400

```
┌─────────────────────────────────────────────┐
│ Using a low dimensional vector, select a set │──── 405
│ of its nearest neighbors from a manifold    │
└─────────────────────────────────────────────┘
                      │
                      ▼
┌─────────────────────────────────────────────┐
│   Construct a modeled manifold using the    │──── 410
│         nearest neighbor vectors            │
└─────────────────────────────────────────────┘
                      │
                      ▼
┌─────────────────────────────────────────────┐
│  Map the low dimensional vector onto the    │──── 415
│             modeled manifold                │
└─────────────────────────────────────────────┘
```

Map a path traversed on a manifold using previously mapped low dimensional vectors — 505

Using the path information, predict the next low dimensional vector projection — 510

FIGURE 5

MODEL-BASED ERROR RESILIENCE IN DATA COMMUNICATION

BACKGROUND

A. Technical Field

The present invention pertains generally to image processing, and relates more particularly to image processing that uses a model-based technique for error recovery in data communication.

B. Background of the Invention

A teleconference application is an example of a data communication system in which the transmitted images of interest, such as human faces, supply information central to the communication scenario. In this kind of application, a sequence of images of a face in a video stream additionally supplies higher level information such as pose, facial expressions, and their evolution over time. This higher level information in combination with the images of interest is important for creating a robust communication scenario.

During a teleconference event, particularly one that is transmitted over a low bandwidth channel, packets may be lost during transmission. These lost packets may result in errors such as missing frames or frames containing partial images. These sorts of errors can strongly affect the perceived quality of the video being transmitted.

SUMMARY OF THE INVENTION

Disclosed are embodiments of systems and methods to use a model-based technique for image error recovery in data communication. A low-dimensional representation is constructed of an image that contains errors. A manifold comprised of previous image representations and a statistical model of the manifold are used to correct the errors in the image.

In embodiments, an error in an image may be corrected by constructing a measurement vector of the image based upon at least some characteristics of the image, computing a low dimensional vector from the measurement vector, computing a mapped low dimensional vector by mapping the low dimensional vector onto a manifold comprising a plurality of low dimensional vectors, and using the mapped low dimensional vector to generate a display image.

In embodiments, mapping the low dimensional vector onto a manifold comprises computing a projection of the low dimensional vector onto the manifold. In embodiments, computing a projection of the low dimensional vector comprises computing a modeled manifold by selecting a set of low dimensional vectors from the manifold that are within a threshold distance of the low dimensional vector and computing a projection of the low dimensional vector onto the modeled manifold.

In other embodiments, mapping the low dimensional vector onto a manifold comprises computing a path traversed on the manifold using a set of low dimensional vectors that were previously mapped onto the manifold and using the path to predict a projection of the low dimensional vector onto the manifold. In embodiments, the path is a time-parameterized path.

In embodiments, using the mapped low dimensional vector to generate a display image comprises generating a display image wherein an adjustment to a non-error pixel value in the image is limited to be no more than a threshold value.

In embodiments in which the manifold comprises multiple models, computing a mapped low dimensional vector comprises using projection onto convex sets to map the low dimensional vector onto the manifold.

In embodiments, the method for correcting an error in an image further comprises updating the manifold by adding a low dimensional vector to the manifold and, responsive to satisfaction of at least one update criterion, updating a model of the manifold.

In embodiments, an error in an image may be corrected by computing a measurement vector of the image using warping and three-dimensional pose information from the image, computing a low dimensional vector from the measurement vector, computing a mapped low dimensional vector by mapping the low dimensional vector onto a manifold comprising a plurality of low dimensional vectors, and using the mapped low dimensional vector to generate a display image.

In embodiments, computing a measurement vector of the image using warping and three-dimensional pose information from the image comprises obtaining warped image data from the image by warping at least a portion of the image into a fix view, obtaining three-dimensional image data from the image by determining a three-dimensional pose of at least a portion of the image, and forming a vector for the image using the warped image data and the three dimensional image data.

In embodiments, a system for correcting an error in an image may comprise a measurement vector generator that constructs a measurement vector of the image based upon at least some characteristics of the image, an image error corrector that computes a mapped low dimensional vector from the measurement vector, and a display image generator that uses the mapped low dimensional vector to generate a display image. In embodiments, the system further comprises a manifold builder that updates the manifold.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 depicts a data communication system according to three alternative embodiments of the invention.

FIG. 4 depicts a method for mapping a vector onto a modeled manifold according to an embodiment of the invention.

FIG. 5 depicts a method for using a path mapped onto a manifold for predicting a vector projection according to an embodiment of the invention.

DETAILED DESCRIPTION OF THE PREFERRED EMBODIMENTS

Figure 1:
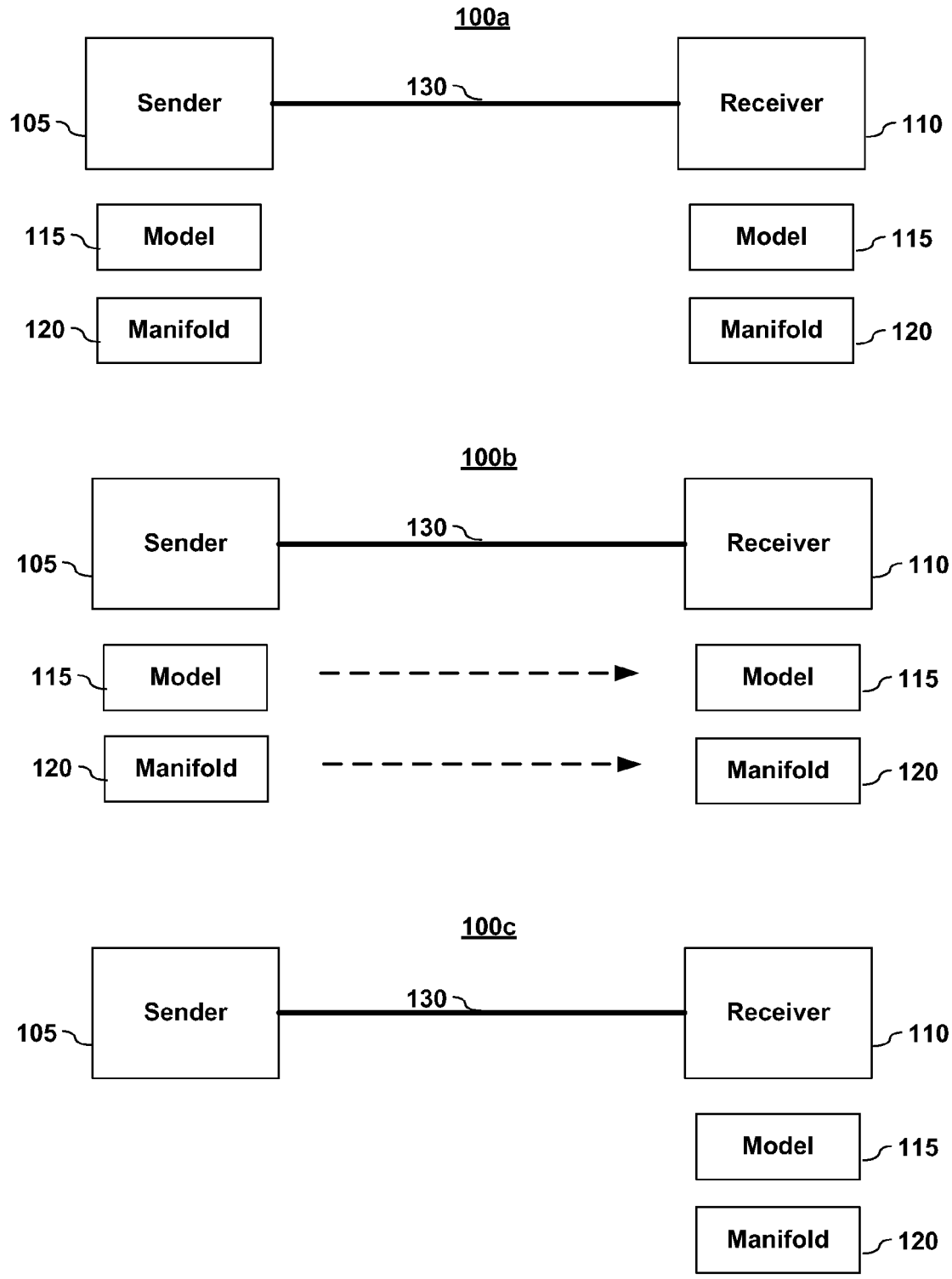

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, computers, mobile devices, including those devices with a display or camera capabilities, multimedia devices, and the like. The embodiments of the present invention may be implemented in software, hardware, firmware, or combinations thereof. Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Presented herein are systems and methods to use model-based techniques for error recovery in data communication. Prior solutions to error recovery typically use interpolation schemes that are based on low-level statistics instead of operating on an adaptive high-level model. These schemes cannot capture invariants that reflect high-level data features. The approach used in the present invention enables runtime error recovery of images being transmitted within a communication system based on high-level data features or constraints.

Embodiments of the present invention are model-based error resilience for use in a communication system transmitting a face image. It should be noted that the present invention may be applied to many types of data and models, including but not limited to video images of faces.

In an embodiment, a face tracker may be used to extract the three-dimensional pose of a face in the image frames that comprise a video stream. An example of a face tracker is disclosed in J. Xiao, T. Moriyama, T. Kanade, and J. Cohn, "Robust Full-Motion Recovery of Head by Dynamic Templates and Re-registration Techniques," *International Journal of Imaging Systems and Technology*, Vol. 13, September 2003, pp. 85-94, which is incorporated herein by reference in its entirety. During the course of its operation, this tracker may map the face pixels onto the surface of a cylinder, and it searches over orientations and locations of this cylinder in previous frames to find a transformation of the facial pose with respect to the current frame. The face tracker in effect performs a three-dimensional registration operation between images of the same face in subsequent frames. When the registration is good, a static image of the face with changing facial expressions is projected on the surface of the model cylinder. The quality of the tracker may be measured by the stability of immobile features (e.g., nose, eye location) on the cylinder surface.

For example, in embodiments, given an initial reference template of a head image (i.e., an initial target image) and the corresponding head pose, a head model can be created and the head motion can be recovered from an input video. Assume, for purposes of explanation, an input image, I, which comprises an array of pixel values at a given time. The image may be denoted as $I(u, t)$, where $u=(u, v)$ represents a pixel in the image at time t. At time interval t+1, the item represented by pixel u at time t moves in the image to a new pixel location, u'. The new position of the pixel may be represented by the equation:

$$u' = F(u, \mu), \quad (1)$$

where $\mu$ represents a motion parameter vector and $F(u,\mu)$ represents a parametric motion model (such as the affine motion) that maps the pixel u to the new location pixel location u'.

In embodiments, it is assumed that the color of the item represented by pixel u at time t does not change when it moves to the new location pixel location u' at time t+1. Thus, if the color values of the item represented in the image do not change between time intervals, the following equation holds true:

$$I(u', t+1) = (I(F(u,\mu), t+1) = I(u, t)) \quad (2)$$

In embodiments, the motion vector $\mu$ may be obtained by minimizing the difference between pixels at time t and time t+1. Minimization may be achieved by adjusting the motion parameters. In embodiments, the motion vector $\mu$ can be obtained by minimization of the following objective function:

$$\min E(\mu) = \sum_{u \in \Omega} (I(F(u, \mu), t+1) - I(u, t))^2 \quad (3)$$

where $\Omega$ is the region of the template at time t. That is, only the pixels within the region $\Omega$ are taken into account for motion recovery. In the example in which the template is a face, the initial reference template face image is a rectangular shape image patch. Thus, the region is defined by the rectangle.

For simplicity of notation, u and t are omitted in some of the following equations.

In general, this class of problems can be solved by using a gradient descent method, such as by way of example and not limitation, the Lucas-Kanade method:

$$\mu = -\left(\sum_{\Omega}(I_u F_\mu)^T(I_u F_\mu)\right)^{-1}\sum_{\Omega}(I_t(I_u F_\mu)^T) \quad (4)$$

where $I_t$ represents the temporal image gradient, $I_u$ represents the spatial image gradient, and $F_\mu$ represents the partial differential of F with respect to $\mu$, which depends on the motion model and is computed at $\mu=0$.

It should be noted that because Equation (4) comes from the linear approximation of Equation (3) by a first-order Taylor expansion, this process has to be iterated. At each iteration, the incremental motion parameters are computed, the template is warped using the incremental transformation, and the warped template is used for the next iteration. This process continues until the solution converges. When the process converges, the motion may be recovered from the composition of the incremental transformations rather than from adding up the incremental parameters directly.

In embodiments, different weights may be assigned to pixels in the template to account for outliers and non-uniform density. For example, Equation (4) may be modified as follows to include weighting factors:

$$\mu = -\left(\sum_{\Omega} w(I_u F_\mu)^T(I_u F_\mu)\right)^{-1}\sum_{\Omega}(w(I_t(I_u F_\mu)^T)) \quad (5)$$

In embodiments, weighting factors may be determined using the warped template and iteratively re-weighted least squares.

Motion Recovery under Perspective Projection. The rigid motion of an item point $X=[x,y,z,1]^T$ between time t and t+1 can be represented according to the following equation:

$$X(t+1) = M \cdot X(t) = \begin{bmatrix} R & T \\ 0 & 1 \end{bmatrix} \cdot X(t) \quad (6)$$

$R_{3\times3}$ is the rotation matrix with 3 degrees of freedom and $T_{3\times1}$ is the three-dimensional translation vector. The full item motion has 6 degrees of freedom.

Assuming small rotations between image frames, the transformation M can be represented as:

$$M = \begin{bmatrix} 1 & -\omega_z & \omega_y & t_x \\ \omega_z & 1 & -\omega_x & t_y \\ -\omega_y & \omega_x & 1 & t_z \\ 0 & 0 & 0 & 1 \end{bmatrix} \quad (7)$$

where $[\omega_x, \omega_y, \omega_z]$ represents the rotations relative to the three axes, and $[t_x, t_y, t_z]$ the three-dimensional translation T.

Under perspective projection (assuming the camera projection matrix depends only on the focal length), the image projection u of X $(=[x,y,z,1]^T)$ at t+1 is:

$$u(t+1) = \begin{bmatrix} x - y\omega_z + z\omega_y + t_x \\ x\omega_z + y - z\omega_x + t_y \end{bmatrix} \cdot \frac{f_L}{-x\omega_y + y\omega_x + z + t_z} \quad (8)$$

where $f_L$ represents the focal length. In embodiments, the focal length may be estimated as follows. Assuming the distance between the face and the camera is about six times the face width in the 3D space and the face width in the image is l pixels, then the focal length is 6l (i.e., six times the face width in the camera image plane). Equation (8) is the parametric motion model $F(\cdot)$ in Equation (2) with the six-dimensional full-motion parameter vector $\mu=[\omega_x, \omega_y, \omega_z, t_x, t_y, t_z]$. It should be noted that $t_z$ is included in Equation (8), so the translations along the depth direction can also be recovered.

$F_\mu$ is initially computed at $\mu=0$, which yields the following equation:

$$F_\mu|_{\mu=0} = \begin{bmatrix} -xy & x^2+z^2 & -yz & z & 0 & -x \\ -(y^2+z^2) & xy & xz & 0 & z & -y \end{bmatrix} \cdot \frac{f_L}{z^2}(t) \quad (9)$$

After each iteration, the incremental transformation is computed using $\mu$. The final transformation matrix is obtained from the composition of the incremental transformations, and the full head motion is recovered from this final transformation matrix. The new head pose may be computed from the composition of the previous pose and the current transformation.

In an embodiment, each face image may be represented as a measurement vector consisting of pixels projected on the cylinder and the pose of the cylinder during tracking. In an embodiment, a statistical face model of a person's face may be developed through analysis of a data set comprised of collected measurement vectors of that individual's face image.

A low dimensional manifold may be built from a set of reduced representations of collected measurement vectors. In an embodiment using a measurement vector representing a face tracker model, this manifold may be used as a low dimensional representation of the facial movement (pose and expression) of an individual face. In an embodiment, a manifold may be built incrementally while images in a video stream are being processed, so that a system may learn a model of a face. Prior to acquiring a model of a face by collecting images in a video stream, a system may use a generic face model based on low Eigen modes of human faces. In an alternative embodiment, a manifold may be transmitted prior to processing. In another alternative embodiment, a manifold may be adapted and modified by the addition of face images collected during data streaming events. A manifold may represent models of one or a plurality of individual faces.

FIG. 1 illustrates three embodiments 100 of data communication systems consisting of a Sender 105 that transmits data to a Receiver 110 over a channel 130. Sender 105 and Receiver 110 may be directly connected, may be connected through one or more intermediary devices, or may be wirelessly connected. Data communication system embodiments 100 illustrate that a model 115 and a manifold 120 can be used by a Sender 105, a Receiver 110, or both. In embodiment 100a, a model 115 and a manifold 120 pre-built using training data may be provided to both the Sender 105 and the Receiver 110 prior to processing a video stream. Alternatively, Sender 105 or Receiver 110 may have generated the model and manifold and provided them to the other party. In embodiment 100b, the Sender 105 may transmit the model 115, the manifold 120, or both to the Receiver 110 prior to video transmission and, in embodiments, the Receiver 110 may build a manifold incrementally as it processes images. In an alternative embodiment, the Sender 105 may take advantage of the fact that the Receiver 110 shares the model. In one embodiment, the Sender 105 may perform image correction before transmitting the image in order to fit an outbound image more closely to the Receiver's 110 manifold 120. In embodiment 100c, only the Receiver 110 may perform model-based error correction on received images and may build and adapt its manifold incrementally as it processes images.

A. Model-Based Methods to Correct a Display Image

Figure 2:
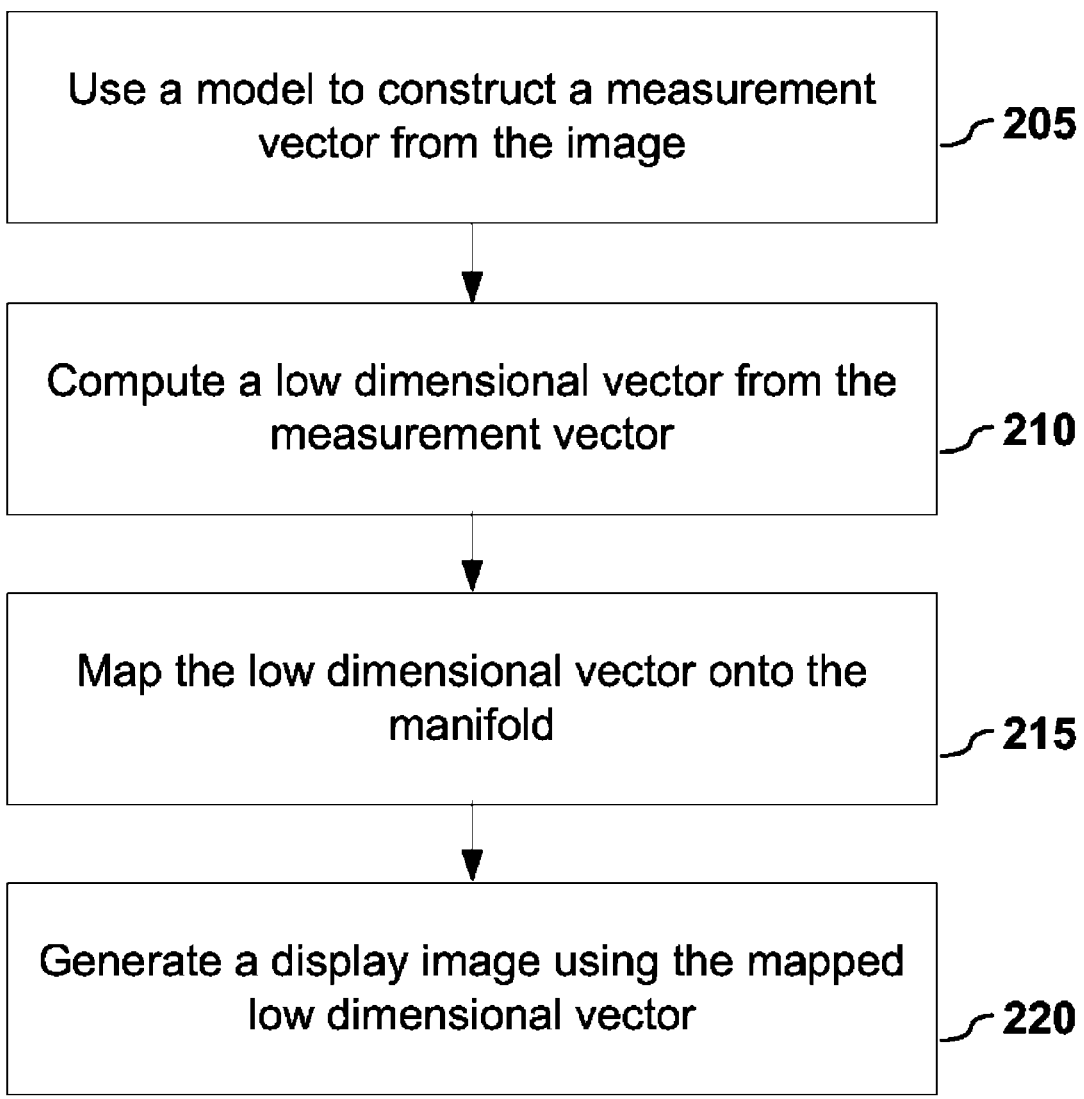
FIG. 2 depicts a method for using a model and a manifold to generate a display image from a received input image according to an embodiment of the invention.

FIG. 2 depicts a method 200 for correcting errors within a transmitted image according to embodiments of the invention. Method 200 comprises the steps of using a model to construct a measurement vector from the transmitted image (205), computing a low dimensional vector from the measurement vector (210), mapping the low dimensional vector onto a manifold (215), and using the mapped low dimensional vector to generate a display image (220).

1. Using a Model to Construct a Measurement Vector

In an embodiment, a Receiver 110 may use a face tracker model to correct face images received with missing pixels due to, for example, dropped packets during transmission from a Sender 105. The face tracker model may be used to generate a measurement vector of an image. In embodiments, as discussed previously, the measurement vector may comprise pixel values and pose information.

2. Computing a Low Dimensional Vector from the Measurement Vector

Figure 3:
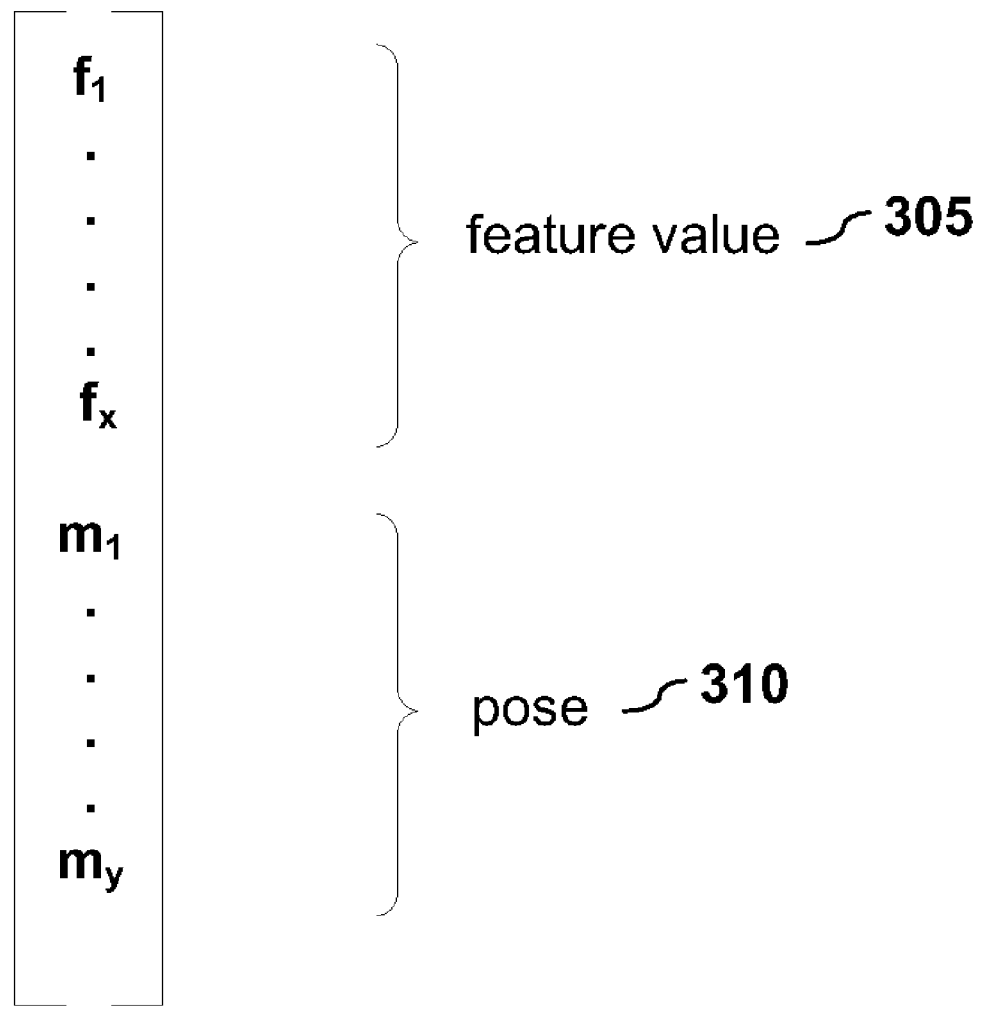
FIG. 3 illustrates an example of an input vector consisting of pixel feature values and pose information according to an embodiment of the invention.

FIG. 3 illustrates an embodiment of a vector 300 that contains pixel features 305 and pose information 310 of a face image that may be encoded into the parameters of a face tracker model 115. It should be noted that the vector 300 may be used to represent parameters of any model and may include one or more vectors.

A measurement vector 300 representing an image frame is constructed (step 210). A dimension-reducing method may be used to compute a lower dimension vector from the measurement vector 300 (step 215). An example of a dimension reducing method is the application of Principal Component Analysis (PCA) to the image measurement vectors in order to define a manifold with dimensions along the principal modes. In a simple dimension reducing example, if the image model were Gaussian and the manifold points distribution were linear, an image instance (point on the manifold) may be represented as a linear combination of a set of image statistical models $$I = \sum_{i=1}^{n} a_i m_i \quad (10)$$

where I is an image instance, n is the number of image vectors in the manifold, $a_i$ is a coefficient representing the low dimensional image model parameter, and $m_i$ is the vector representing the $i^{th}$ principal mode.

3. Embodiments for Mapping a Vector onto a Manifold

In embodiments, a low dimensional input image vector may be computed from an image measurement vector 300 containing uncertain features due to a transmission error. In an embodiment in which the received image is a face image, the uncertain features may represent the portion or portions of the image that have missing pixel information. Due to the uncertain features in the measurement vector, the constructed low dimensional image vector may not map to a point on the manifold 120. Thus, in step 215 of method 200, the low dimensional input image vector may be projected onto the manifold 120 and that projection may be used to generate a corrected display image. Continuing the example previously described, the projection is $I^+$ and the new coefficients of the projection are $a_i^+$:

$$I^+ = \sum_{i=1}^{n} a_i^+ m_i \quad (11)$$

It should be noted that this example was used for illustrative purposes. The present invention may be applied to non-linear systems. It also should be noted that PCA was used for illustrative purposes, and that a person skilled in the art may select another analysis method for manifold construction including, but not limited to, Independent Component Analysis, Multi-Dimensional Analysis (MDA), and manifold building by example.

In an embodiment, processing may be optimized by separating a complex manifold into sections using a method such as Locally Linear Embedding (LLE) or Isomap, although a person skilled in the art shall recognize that other methods may be employed. If, in an embodiment, PCA were being used to generate a low dimensional image model, PCA may be applied to each section and the model coefficient(s) may be derived from the set of PCA results.

a) Mapping By Projection onto a Modeled Manifold

FIG. 4 depicts a method 400 for mapping a low dimensional vector onto a modeled manifold according to embodiments of the invention. Method 400 comprises the steps of selecting a set of nearest neighbors to the vector on the manifold (405), constructing a modeled manifold using the set of nearest neighbors (410), and mapping the low dimensional vector onto the modeled manifold (415). Method 400 may be implemented as step 215 of embodiments of method 200.

A modeled manifold may be built from a set of k nearest neighbors to the computed low dimensional vector representing the image (steps 405 and 410). In step 415, the low dimensional vector representing the image is projected onto the modeled manifold. This projection may then be used to generate a corrected display image (step 220 of method 200).

b) Predicting a Projection Using Path Information

FIG. 5 depicts a method 500 for mapping a low dimensional vector onto a manifold by using path information according to embodiments of the invention. Method 500 comprises the steps of mapping a path traversed on a manifold by previously mapped low dimensional vectors (505), and using the path information to predict the next low dimensional vector projection (510). Method 500 may be implemented as an embodiment of step 215 of method 200 and is an alternative embodiment to method 400.

Figure 6:
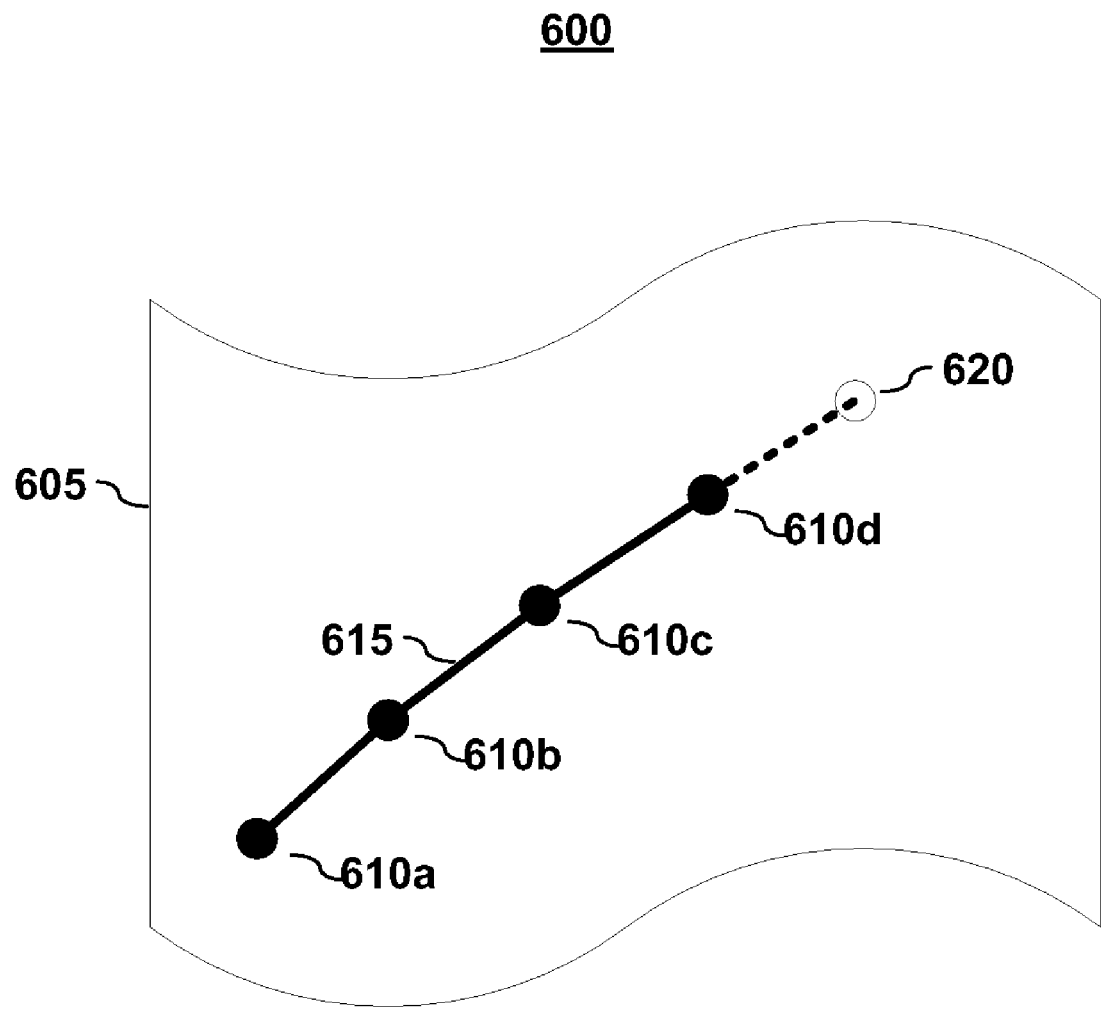
FIG. 6 graphically illustrates a method for using a path mapped onto a manifold for predicting a vector projection according to an embodiment of the invention.

In embodiments using a face tracker image model, low dimensional vectors previously mapped onto a manifold define a path (step 505), which may be a time-parameterized path, that captures the evolution of face pose and facial expression. FIG. 6 graphically illustrates an example path 615. Points 610a-610d represent previous low dimensional vector mappings onto a manifold 605. The path 615 may be used to predict (step 510) the projection 620 of a current low dimensional input vector that represents a face image with missing pixels. The predicted next projection 620 may be used to generate a corrected display image (step 220 of method 200).

B. Using a Manifold to Adjust a Corrected Image

In an embodiment, a computed low dimensional vector representing an image with missing pixels may map to a point that is at a distance from the manifold. This large distance means that there may be large differences between the feature values in the projection and their corresponding known feature values in the low dimensional vector. If all of the features of the projection were used to generate a corrected display image, the corrected image may appear disjoint from the preceding images in a data stream. Thus, in embodiments, the corrected image may be generated by using the manifold to reconstruct missing pixels and to adjust the features of the known pixels instead of replacing them.

Figure 7:
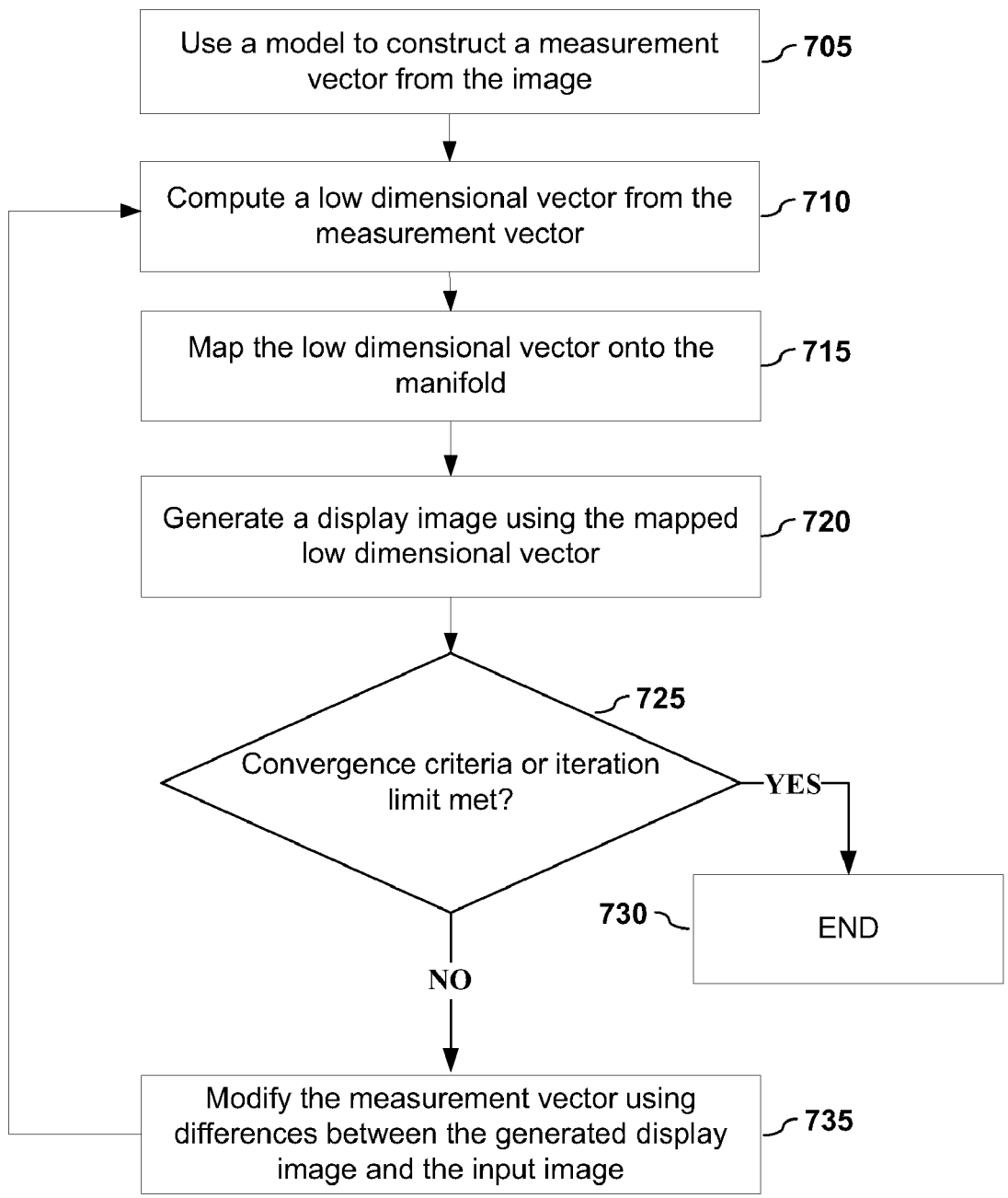
FIG. 7 depicts a method for using a manifold and interpolation to correct an image according to an embodiment of the invention.

FIG. 7 depicts an embodiment of a method 700 to produce a corrected image that seeks to integrate smoothly into a sequence of images. Steps 705-715 may be considered an embodiment of steps 205-215 in method 200. In embodiments, missing pixels in the generated display image (step 720) are specified by the projection of the low dimensional vector onto the manifold while the color intensity values of known, non-error, pixels may be adjusted according to the equation $$i_0 = \begin{cases} i_0 + t, & \text{for } i_1 - i_0 > t \\ i_0 - t, & \text{for } i_1 - i_0 < -t \\ i_1, & \text{for } |i_1 - i_0| \leq t \end{cases} \quad (12)$$

where $i_0$=a known pixel's color intensity; $i_1$=the color intensity of the corresponding pixel in the manifold projection; and t=a noise-determined threshold. In embodiments, the threshold may be set by the transmitter by measuring the noise in the input source (e.g., camera, webcam, etc.). In embodiments, the threshold may also be set by the receiver based on display characteristics, for example, based on the amount an input color can change before a significant change is perceived on the display.

If the low dimensional vector either maps onto the manifold or to a point within a threshold distance from the manifold, the solution may be considered to have converged and the display image generated from the mapped low dimensional vector (step 720) may be considered to be the corrected display image (step 730). However, if the convergence criteria are not met, a measurement vector may constructed or modified using the display image (step 735) and steps 710-720 may then be repeated for the display image until either the convergence criteria are met or a pre-determined number of iterations are completed (step 725). In embodiments, the measurement vector may be modified using differences between the generated display image and the input image.

C. Adaptive Method for Building a Manifold

The addition of data points to a manifold is a mechanism that a system may use to learn, such as, for example, the faces of individuals, and thus adapt to its users. That is, the increase of the size of the data set helps develop a more complete and more robust manifold. In embodiments of system 100, the addition of data may alter the manifold 120 and thus may necessitate updating the statistical model 115 which is derived from the data set. In an embodiment of system 100 that corrects images using a face tracker model using a manifold representing a statistical face model, images representing either new poses, different expressions of an individual face, or images of a different face may be added as data to the manifold during processing of face images.

Figure 8:
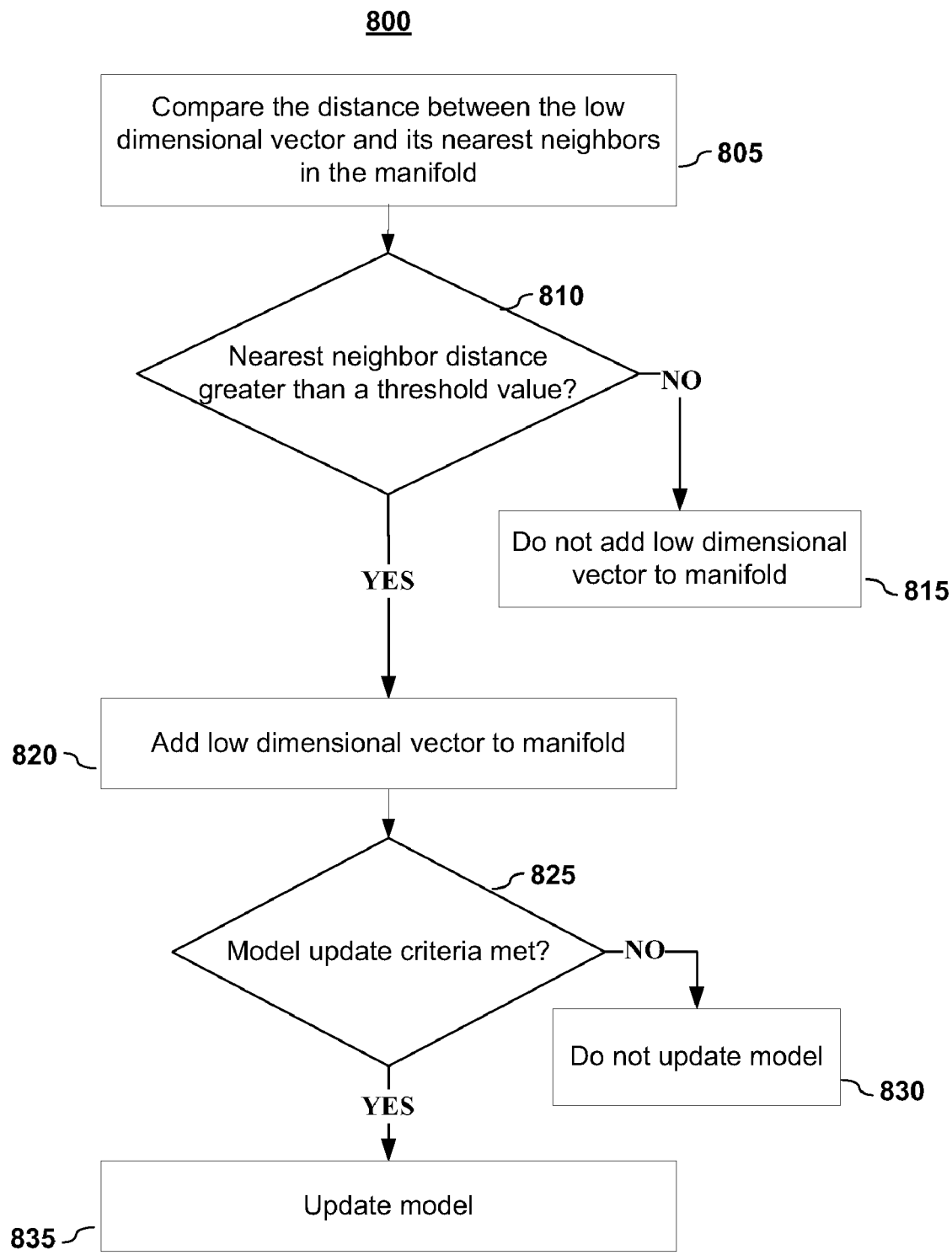
FIG. 8 depicts a method to use input image data to adapt a manifold, a model, or both according to an embodiment of the invention.

FIG. 8 depicts a method 800 for adapting a manifold using received input data according to embodiments of the invention. In an embodiment, this method may be employed after the construction of a low dimensional vector from a measurement vector 300 such as would occur at completion of an embodiment of step 210 in method 200. In step 805, the distance between the mapping of a low dimensional vector and its nearest neighbors in the manifold is examined. In embodiments, if the input vector either maps onto the manifold or to a point within a threshold distance of its nearest neighbors on the manifold (step 810), it may not be added to the manifold because it already is represented by the statistical model (step 815). If the low dimensional vector maps to a point off of the manifold and outside a threshold distance from its nearest neighbors on the manifold, the input vector may be added to the manifold (step 820).

Since the low dimensional manifold represents a statistical model of input data variability, the model may be updated (step 835) to reflect the new state of the manifold after the addition of one or a plurality of data points. For example, in an embodiment in which the model is based on PCA, a model update may involve re-running a PCA to re-determine principal modes. Model update criteria (step 835) may be set to determine when a model update may take place. Example criteria include, but are not limited to, the number of additions of new input vectors and average distance of mapping of input vectors from nearest neighbors on the manifold, but a person skilled in the art shall recognize that alternative criteria may be selected. In embodiments, the model may not be updated if the model criteria are not met (step 830).

D. Methods for Projecting onto a Manifold Representing a Plurality of Models

An embodiment of a manifold 120 may represent a plurality of models. For example, in an embodiment, a model 115 may itself be composed of a set of models, each of which may represent a different component of a face image. In an embodiment in which a model 115 is a set of models and an error correction method such as method 200 may be employed, an embodiment of the present invention involves a method to project a constructed low dimensional vector onto a manifold that represents a plurality of models.

Figure 9:
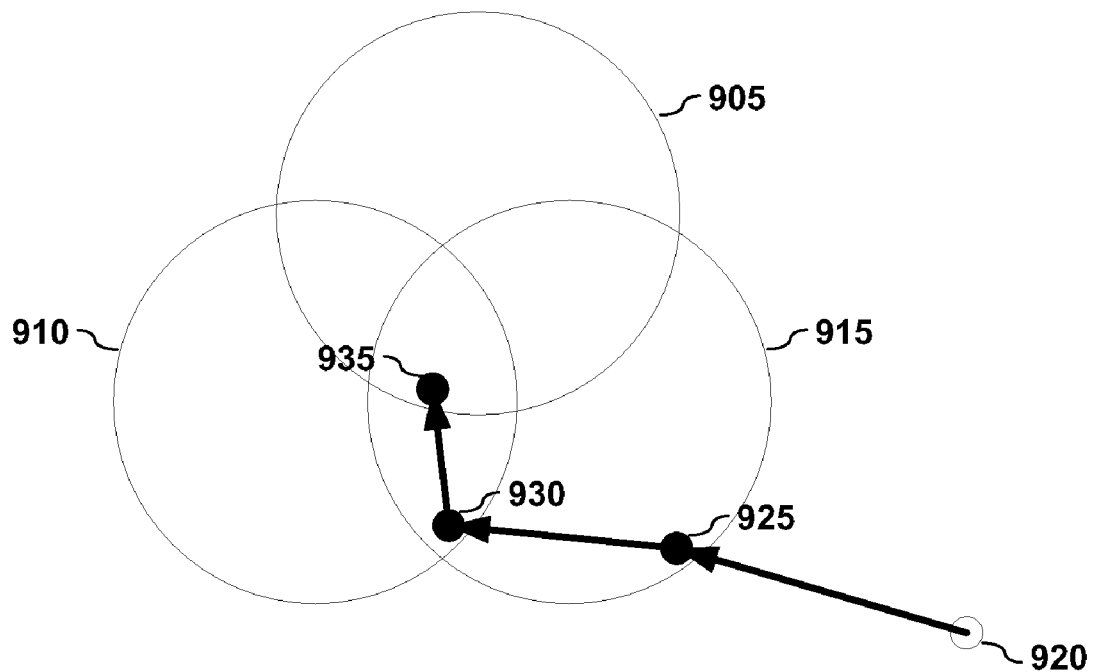
FIG. 9 illustrates a method for projecting a vector onto a manifold representing a plurality of models according to an embodiment of the invention.

FIG. 9 is a graphical illustration of a method 900 to derive a projection of a low dimensional vector onto a plurality of models. Method 900 is an alternative embodiment of step 215 of method 200. Method 900 illustrates an iterative projection onto convex sets method (POCS). A person skilled in the art may select alternative methods to POCS.

In FIG. 9, the circles 905, 910, and 915 graphically represent a manifold containing three models. The mapped low dimensional vector 920 is iteratively projected onto each model space (925, 930, 935) within the manifold until a projection 935 is identified that satisfies the constraints of all three models.

E. System Implementations

Figure 10:
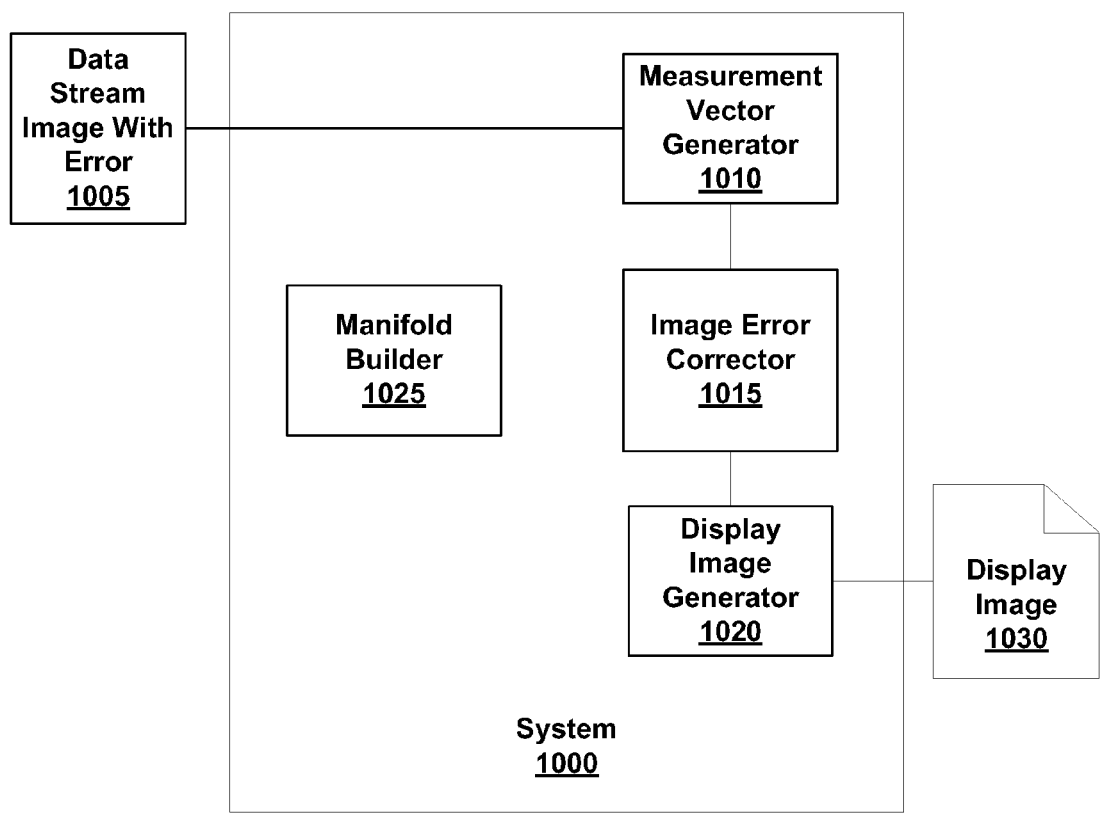
FIG. 10 depicts a block diagram of a model-based image error correction system according to an embodiment of the invention.

FIG. 10 depicts a model-based image error correction system 1000 according to embodiments of the invention. Model-based image error correction system 1000 comprises a measurement vector generator 1010, an image error corrector 1015, a display image generator 1020, and a manifold adaptor 1025.

In an embodiment, measurement vector generator 1010 receives an image 1005 from a frame that may have come from a data stream such as, for example, a video stream. In an alternative embodiment, the image 1005 may have come from a static frame. The image has been determined to contain an error such as, for example, missing pixels. In an embodiment, a model such as, for example, the face tracker model is used to generate a modeled image, which is a description of the image in terms of the model parameters. As disclosed in an embodiment of step 205 of method 200, an example of a modeled image is a measurement vector 300.

In an embodiment, image error corrector 1015 mitigates the error in the image by generating a corrected representation of the image. As disclosed in an embodiment of steps 210 and 215 of method 200, the modeled image may be mapped to a manifold that has been built using previously processed or created modeled images. In an embodiment of step 215 of method 200, the mapped point on the manifold may be used to supply the values for uncertain features in the modeled image.

In an embodiment, display image generator 1020 generates a display image from the corrected representation of the modeled image as disclosed for embodiments of step 220 of method 200. The corrected representation may be used directly, or it may be used to adjust the initial modeled image as disclosed for embodiments of method 700.

In an embodiment, manifold builder 1025 adds a received modeled image or a plurality of received modeled images to a manifold. As disclosed for embodiments of method 800, addition of new points (modeled images) may change the manifold and thus the statistical model represented by the manifold may be updated.

It shall be noted that the present invention may be implemented in any instruction-execution/computing device or system capable of processing the image data, including without limitation, a general-purpose computer and a specific computer, such as one intended for graphics processing. The present invention may also be implemented into other computing devices and systems, including without limitation, a digital camera, a printer, a scanner, a multiple function printer/scanner, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 11:
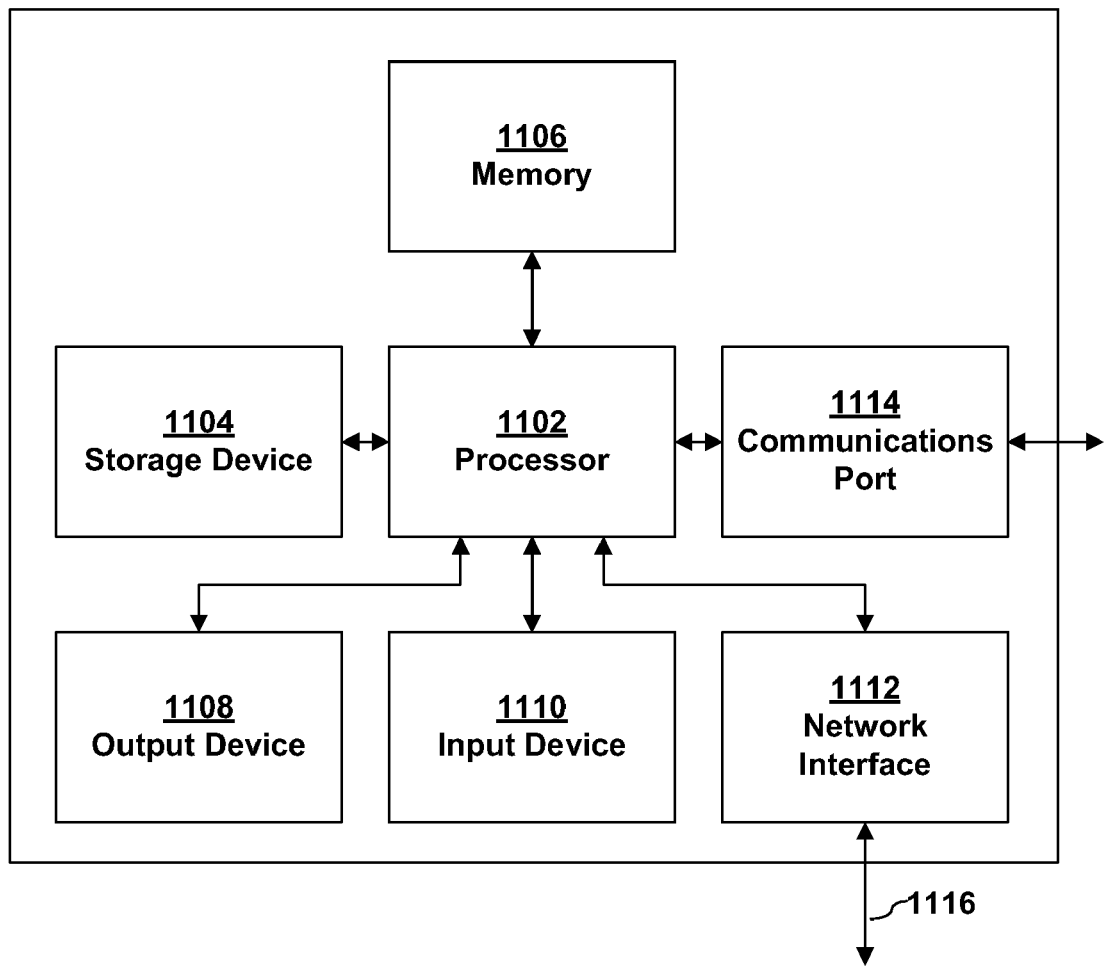
FIG. 11 depicts a block diagram of a computing system according to an embodiment of the invention.

FIG. 11 depicts a functional block diagram of an embodiment of an instruction-execution/computing device 1100 that may implement or embody embodiments of the present invention. As illustrated in FIG. 11, a processor 1102 executes software instructions and interacts with other system components. In an embodiment, processor 1102 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1104, coupled to processor 1102, provides long-term storage of data and software programs. Storage device 1104 may be a hard disk drive and/or another device capable of storing data, such as a computer-readable media (e.g., diskettes, tapes, compact disk, DVD, and the like) drive or a solid-state memory device. Storage device 1104 may hold programs, instructions, and/or data for use with processor 1102. In an embodiment, programs or instructions stored on or loaded from storage device 1104 may be loaded into memory 1106 and executed by processor 1102. In an embodiment, storage device 1104 holds programs or instructions for implementing an operating system on processor 1102. In one embodiment, possible operating systems include, but are not limited to, UNIX, AIX, LINUX, Microsoft Windows, and the Apple MAC OS. In embodiments, the operating system executes on, and controls the operation of, the computing system 1100.

An addressable memory 1106, coupled to processor 1102, may be used to store data and software instructions to be executed by processor 1102. Memory 1106 may be, for example, firmware, read only memory (ROM), flash memory, non-volatile random access memory (NVRAM), random access memory (RAM), or any combination thereof. In one embodiment, memory 1106 stores a number of software objects, otherwise known as services, utilities, or modules. One skilled in the art will also recognize that storage 1104 and memory 1106 may be the same items and function in both capacities. In an embodiment, one or more of the components of FIG. 10 may be modules stored in memory 1104, 1106 and executed by processor 1102.

In an embodiment, computing system 1100 provides the ability to communicate with other devices, other networks, or both. Computing system 1100 may include one or more network interfaces or adapters 1112, 1114 to communicatively couple computing system 1100 to other networks and devices. For example, computing system 1100 may include a network interface 1112, a communications port 1114, or both, each of which are communicatively coupled to processor 1102, and which may be used to couple computing system 1100 to other computer systems, networks, and devices.

In an embodiment, computing system 1100 may include one or more output devices 1108, coupled to processor 1102, to facilitate displaying graphics and text. Output devices 1108 may include, but are not limited to, a display, LCD screen, CRT monitor, printer, touch screen, or other device for displaying information. Computing system 1100 may also include a graphics adapter (not shown) to assist in displaying information or images on output device 1108.

One or more input devices 1110, coupled to processor 1102, may be used to facilitate user input. Input device 1110 may include, but are not limited to, a pointing device, such as a mouse, trackball, or touchpad, and may also include a keyboard or keypad to input data or instructions into computing system 1100.

In an embodiment, computing system 1100 may receive input, whether through communications port 1114, network interface 1116, stored data in memory 1104/1106, or through an input device 1110, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for correcting an error in an image comprising pixels, the method comprising:
   constructing a measurement vector of the image based upon at least some characteristics of the image;
   computing a low dimensional vector from the measurement vector;
   computing a mapped low dimensional vector by mapping the low dimensional vector onto a manifold comprising a plurality of low dimensional vectors; and
   using the mapped low dimensional vector to generate a display image, including generating a display image wherein an adjustment to a non-error pixel value in the image is limited to be no more than a threshold value.

2. The method of claim 1 wherein mapping the low dimensional vector comprises computing a projection of the low dimensional vector onto the manifold.

3. The method of claim 2 wherein the step of computing a projection of the low dimensional vector onto the manifold comprises:
   computing a modeled manifold by selecting a set of low dimensional vectors from the manifold that are within a threshold distance of the low dimensional vector; and
   computing a projection of the low dimensional vector onto the modeled manifold.

4. The method of claim 1 wherein mapping the low dimensional vector onto a manifold comprises:
   computing a path traversed on the manifold using a set of low dimensional vectors that were previously mapped onto the manifold; and
   using the path to predict a projection of the low dimensional vector onto the manifold.

5. The method of claim 1, wherein the step of computing a mapped low dimensional vector comprises:
   responsive to the manifold comprising multiple models, using projection onto convex sets to map the low dimensional vector.

6. The method of claim 1 further comprising updating the manifold by:
   adding a low dimensional vector to the manifold; and
   responsive to satisfaction of at least one update criterion, updating a model of the manifold.

7. A non-transitory computer-readable medium carrying one or more sequences of instructions which, when executed by one or more processors, cause the one or more processors to perform at least the steps of the method of claim 1.

8. A system for correcting an error in an image comprising pixels, the system comprising:
   a measurement vector generator, coupled to receive an image, that constructs a measurement vector of the image based upon at least some characteristics of the image;
   an image error corrector, coupled to receive the measurement vector, that computes a mapped low dimensional vector from the measurement vector by computing a low dimensional vector from the measurement vector and mapping the low dimensional vector onto a manifold comprising a plurality of low dimensional vectors from a plurality of images; and
   a display image generator, coupled to receive a mapped low dimensional vector, that uses the mapped low dimensional vector to generate a display image, including generating a display image wherein an adjustment to a non-error pixel value in the image is limited to be no more than a threshold value.

9. The system of claim 8 further comprising a manifold builder, coupled to receive a low dimensional vector, that updates the manifold by:
   adding a low dimensional vector to the manifold; and
   responsive to satisfaction of at least one update criterion, updating a model of the manifold.

10. The system of claim 8 wherein the display image generator adjusts the display image by using a noise-determined threshold to adjust characteristics of pixels within the image that were not corrected in the display image.

* * * * *